United States Patent [19]

Federico et al.

[11] Patent Number: 4,629,089
[45] Date of Patent: Dec. 16, 1986

[54] PROTECTIVE DEVICE FOR CHILD-PROOFING A VCR

[76] Inventors: Vincent Federico; Barbara Federico, both of 62 Mapleton Ave., Staten Island, N.Y. 10306

[21] Appl. No.: 814,265

[22] Filed: Dec. 30, 1985

[51] Int. Cl.⁴ .................. B65D 43/14; B65D 51/04
[52] U.S. Cl. .................. 220/334; 220/82 R; 220/377
[58] Field of Search .............. 220/82 R, 334, 377; 206/305

[56] References Cited

U.S. PATENT DOCUMENTS 3,482,895 12/1969 Becklin ........................ 206/305
3,856,177 12/1974 Fudge ........................ 220/82 R
4,458,813 7/1984 Tushinsky et al. ............ 206/305

Primary Examiner—George T. Hall

[57] ABSTRACT

A child-proofing device for an electrical or an electronic appliance includes a panel for covering the controls on the appliance. The panel is made from a material which is rigid or at least semirigid to prevent operation of the controls through the panel. The panel is mounted for movement between a closed position for denying access to the controls and an open position for providing access to the controls. A suitable lock is provided for maintaining the panel in the closed position to prevent a child from tampering with the controls.

7 Claims, 3 Drawing Figures

PROTECTIVE DEVICE FOR CHILD-PROOFING A VCR

BACKGROUND OF THE INVENTION

1. Field of the Invention

The invention generally relates to appliance protective devices, and more specifically to a child-proofing device for preventing tampering with electrical and/or electronic devices such as VCRs and the like.

2. Description of the Prior Art

It is well known that infants and small children are attracted to electrical and electronic devices and seek to play with such devices. The greater the number of lights, switches and buttons, the greater the attraction. Unfortunately, such devices were not designed for very young children and are more often than not very sensitive to abuse. Not only can the child damage the device but, of even greater importance is that once the child is attracted to the device the child can be seriously injured by receiving a shock upon playing with or tampering with the device.

In the instance of a video cassette recorder (VCR), for example, dust covers are available which typically slip over the top of the VCR to maintain the VCR dust-free. However, such dust covers are normally made from thin sheet plastic material and are not designed nor intended to prevent a child from tampering with the VCR. The cover can be easily lifted and, certainly, the small hand of a child can readily slip under the dust cover to obtain access to the controls. It is also possible with most dust covers, because of the light gauge of plastic from which the covers are made, for the child to tamper with the controls through the cover itself. Additionally, the dust cover must be lifted off the VCR and stored while the VCR is used by the adult. Sometimes the cover is not immediately replaced and this renders the cover suceptible to loss.

Also known are carrying or travelling cases for electronic devices, such as VCRs. Such cases are either made of rigid materials, such as aluminum valises, or from thick padded synthetic fabric materials, such as zippered cases. While the aforementioned cases could prevent tampering by a child they are not convenient and thus unsuitable for in-house use.

SUMMARY OF THE INVENTION

Thus, a primary object of the present invention is to provide a device for child-proofing a electrical and/or an electronic device while rendering the device easy and convenient to use during normal use by an adult.

It is another object of the present invention to provide a child-proofing device of the type suggested the previous object which is simple and inexpensive to manufacture.

It is still another object of the present invention to provide a child-proofing device of the type under discussion which can assume many forms to accomodate a wide range of electrical and/or electronic devices.

In order to achieve the above objects, as well as others which will become apparent from the discussion that follows, a device for child-proofing an electrical and/or an electronic device having a first wall on which the controls are mounted and a second wall to which the wires and cables of the device are connected, in accordance with the present invention, to protect against undesired tampering with the controls comprises a panel for covering at least the controls on said device wall. Mounting means are provided for movably mounting said panel between a first closed position for denying access to the device controls and a second open position for providing access to the device controls. Advantageously, locking means are provided for locking said panel in said closed position when access to the VCR controls are to be denied, said panel being made from a material which is at least semi-rigid to prevent operation of the controls of the device by accessing same through said panel.

BRIEF DESCRIPTION OF THE DRAWINGS

A presently preferred embodiment of the invention will now be described in conjunction with drawings, in which.

DESCRIPTION OF A PREFERRED EMBODIMENT

Figure 1:
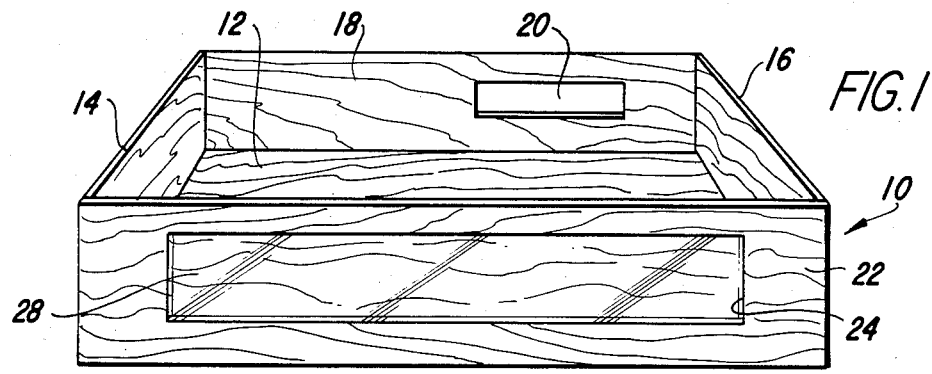
FIG. 1 is a frontal prospective view of a child-proof protecting device for a VCR in accordance with the present invention, showing the device in its normal protecting condition.
Figure 2:
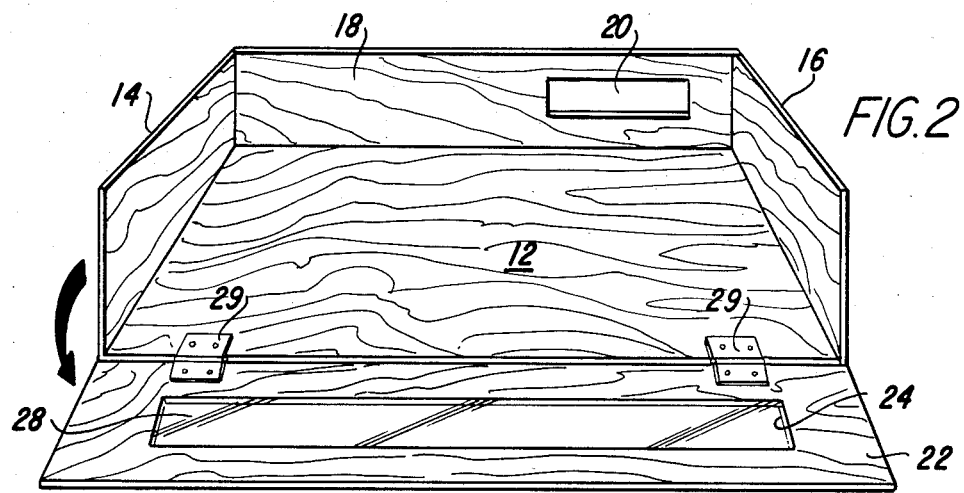
FIG. 2 is similar to FIG. 1, but showing the device in a condition for use of the VCR by an adult and exposing the VCR controls.

Now referring specifically to the drawings, wherein identical or similar parts are designated by the same reference numerals throughout, and first referring to FIGS. 1 and 2, a child-proof protecting device for a VCR is generally designated by the reference numeral 10.

The device 10 is shown to be in the nature of a partial enclosure having a bottom panel 12, two side panels 14 and 16, a rear panel 18 having an opening 20 and a front panel 22 having an opening 24. While the opening 20 remains uncovered the opening 24 is advantageously fitted with a rigid transparent sheet of material such as "Plexiglass" of window 28.

Referring to FIG. 2, the bottom panel 12 is shown to be pivotally connected to the front panel 22 by means of hinges 29. Thus, the front panel 22 can be moved from an upright position as shown in FIG. 1 to a lower position as shown in FIG. 2.

When a VCR is placed into the device 10, the power cord, antenna wire and connecting cables can be brought in through the opening 20 and connected to the VCR. With the front panel 22 in its upright position (FIG. 1) the VCR's visual displays and controls are visible through the window 28. While a child, therefore, can see the displays and controls it can only touch the panels of the device 10. This protects both the child as well as the VCR.

Figure 3:
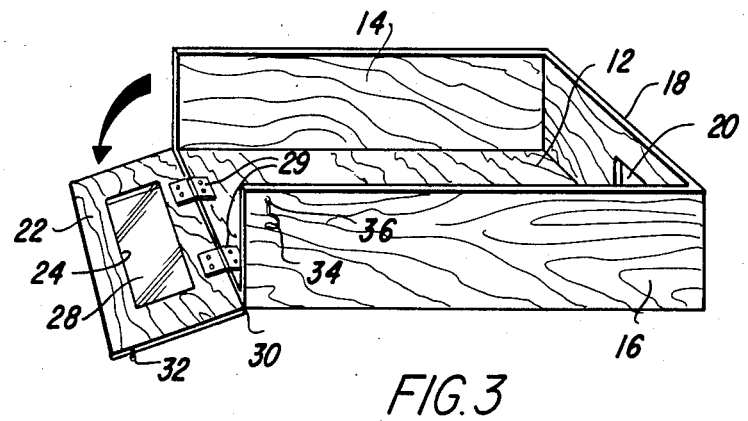
FIG. 3 is side prospective view of the device shown in FIGS. 1 and 2 and showing the details of a locking mechanism for locking the device in its protecting condition.

In order to maintain the protecting condition, even when the child is unsupervised by an adult, there is advantageously provided a locking mechanism 30 which locks the front panel in its upright or protecting condition. Any suitable locking mechanism can be used. Shown in FIG. 3 is a locking mechanism consisting of a locking pin 32 and a hook 34 which can engage the pin 32. A spring 36 can be provided which prevents the hook from being separated from the pin 32 without the dexterity and manipulation skills normally possessed only by adults.

In the device as shown, no top panel has been provided because some VCR models are top loading and also because ventilation is maximized. However, for front loading models a top panel may be used if it is provided with ventilation slots or openings.

While the invention has been described in connection with a VCR it will be evident that the invention can be used to prevent tampering with other electrical and/or electronic devices, such as radios, amplifiers, stereo sets, receivers and the like.

While the device 10 is shown to be in the form of an enclosure having five sides or panels, it should also be evident that fewer panels can be used. For example, the side panels can be eliminated since this would not normally expose anything which can be damaged or which can injure a child. In a minimal configuration only the front panel 22 need be used as long as there is provided a secure and reliable means used to fix the front panel in the protecting position and easily moving it out of the way, by an adult only, to a position which exposes the controls. For example, the device 10 can be reduced to only the front and bottom panels 22 and 12, respectively, and still achieve the objects of the present invention. In place of the bottom panel 12, the front panel 22 can be secured in other ways which will become readily evident to those skilled in the art, such as straps or belts which circle the VCR and are attached to the front panel 22.

Whatever configuration is used, it is an important feature of the invention to make the front panel 22 (which denies access to a child of the controls) from at least a semi-rigid material. Such material prevents a child from accessing or controlling the controls through the front panel 2. While the material may be rigid, such as wood, metal or hard plastics, it may also be made from materials which are not absolutely rigid, such as thick vinyl sheet.

While the principles of the present invention have been described above in relation with a particular embodiment, it must be clearly understood that the description has only been given by way of example and does not limit the scope of the invention.

What is claimed is:

1. Device for child-proofing an electrical or an electronic appliance having a first wall on which controls are mounted and a second wall to which wires and/or cables are connected against undesired tampering with the controls, comprising:
   a. a panel for covering at least the controls on said first wall;
   b. mounting means for movably mounting said panel between a first closed position for denying access to the controls and a second open position for providing access to the controls; and
   c. locking means for locking said panel in said closed position when access to the controls are to be denied, said panel being made from a material that is at least semi-rigid to prevent operation of the controls accessing same through said panel.

2. A device as defined in claim 1, wherein said panel comprises a front panel of an enclosure having a bottom, a rear and two side panels.

3. A device as defined in claim 2, wherein said front panel is hingedly connected to said bottom panel.

4. A device as defined in claim 2, wherein said locking means comprises a pin mounted on one of said front and a side panel and a hook on the other of said front and side panel.

5. A device as defined in claim 2, wherein said rear panel includes an opening for the passage of the wires and/or cables.

6. A device as defined in claim 1, wherein said panel includes a window dimensioned to permit viewing of a display when said panel is in the closed position.

7. A device as defined in claim 6, wherein said window is formed of a "Plexiglass" material.

* * * * *